United States Patent
Cooper, III et al.

(10) Patent No.: US 10,501,160 B1
(45) Date of Patent: Dec. 10, 2019

(54) COOLING ARRANGEMENTS AND COOLING WATER SPRAYERS FOR MARINE ENGINES

(71) Applicant: Brunswick Corporation, Lake Forest, IL (US)

(72) Inventors: Robert D. Cooper, III, Blaine, MN (US); Pankaj Ankush Jagadale, Fond du Lac, WI (US); Joseph J. Klemp-Hawig, Oshkosh, WI (US); Michael A. Torgerud, Mount Calvary, WI (US)

(73) Assignee: Brunswick Corporation, Mettawa, IL (US)

( * ) Notice: Subject to any disclaimer, the term of this patent is extended or adjusted under 35 U.S.C. 154(b) by 310 days.

(21) Appl. No.: 15/608,162

(22) Filed: May 30, 2017

(51) Int. Cl.
*B63H 20/24* (2006.01)
*B63H 20/28* (2006.01)
*B63H 21/32* (2006.01)

(52) U.S. Cl.
CPC ............. *B63H 20/28* (2013.01); *B63H 20/24* (2013.01); *B63H 21/32* (2013.01)

(58) Field of Classification Search
CPC ........ B63H 21/32; B63H 20/24; B63H 2/245; B63H 20/26; B63H 20/28
See application file for complete search history.

(56) References Cited

U.S. PATENT DOCUMENTS

| 7,001,231 | B1 | 2/2006 | Halley et al. |
| 7,942,138 | B1 | 5/2011 | Better et al. |
| 8,500,501 | B1 | 8/2013 | Taylor et al. |
| 8,540,536 | B1 * | 9/2013 | Eichinger .............. F01N 3/04 440/88 C |
| 9,365,275 | B1 | 6/2016 | Habeck et al. |
| 9,403,588 | B1 | 8/2016 | George et al. |
| 9,616,987 | B1 | 4/2017 | Langenfeld et al. |

* cited by examiner

*Primary Examiner* — Jacob M Amick
(74) *Attorney, Agent, or Firm* — Andrus Intellectual Property Law, LLP (57) ABSTRACT

A marine engine has an internal combustion engine; an exhaust conduit that conveys exhaust gas from the internal combustion engine; a cooling water sprayer that sprays a first flow of cooling water into the exhaust conduit; and a cooling water jacket that conveys a second flow of cooling water alongside the exhaust conduit so that the second flow of cooling water cools the exhaust conduit. The first flow of cooling water and at least part of the second flow of cooling water are merged and then sprayed together into the exhaust conduit via the cooling water sprayer.

20 Claims, 9 Drawing Sheets

COOLING ARRANGEMENTS AND COOLING WATER SPRAYERS FOR MARINE ENGINES

FIELD

The present disclosure relates to marine engines, and particularly to cooling arrangements and cooling water sprayers for marine engines.

BACKGROUND

The following U.S. Patents are incorporated herein by reference in entirety.

U.S. Pat. No. 9,616,987 discloses a marine engine having a cylinder block with first and second banks of cylinders that are disposed along a longitudinal axis and extend transversely with respect to each other in a V-shape so as to define a valley there between. A catalyst receptacle is disposed at least partially in the valley and contains at least one catalyst that treats exhaust gas from the marine engine. A conduit conveys the exhaust gas from the marine engine to the catalyst receptacle. The conduit receives the exhaust gas from the first and second banks of cylinders and conveys the exhaust gas to the catalyst receptacle. The conduit reverses direction only once with respect to the longitudinal axis.

U.S. Pat. No. 9,365,275 discloses an outboard marine propulsion device having an internal combustion engine with a cylinder head and a cylinder block, and an exhaust manifold that discharges exhaust gases from the engine towards a vertically-extending catalyst housing. The exhaust manifold has a plurality of horizontally extending inlet runners that receive the exhaust gases from the engine and a vertically-extending collecting passage that conveys the exhaust gases from the plurality of horizontally-extending inlet runners to a bend that redirects the exhaust gases downwardly towards the catalyst housing.

U.S. Pat. No. 8,540,536 discloses a cooling system for a marine engine having an elongated exhaust conduit with a first end receiving hot exhaust gas from the marine engine and a second end discharging the exhaust gas, and an elongated cooling water jacket extending adjacent to the exhaust conduit. The cooling water jacket receives raw cooling water at a location proximate to the second end of the exhaust conduit, conveys raw cooling water adjacent to the exhaust conduit to thereby cool the exhaust conduit and warm the raw cooling water, and thereafter discharges the warmed cooling water to cool the internal combustion engine.

U.S. Pat. No. 8,500,501 discloses an outboard marine drive including a cooling system drawing cooling water from a body of water in which the outboard marine drive is operating and supplying the cooling water through cooling passages in an exhaust tube in the driveshaft housing, a catalyst housing, and an exhaust manifold, and thereafter through cooling passages in the cylinder head and the cylinder block of the engine. A 3-pass exhaust manifold is provided. A method is provided for preventing condensate formation in a cylinder head, catalyst housing, and exhaust manifold of an internal combustion engine of a powerhead in an outboard marine drive.

U.S. Pat. No. 7,942,138 discloses an outboard motor having an exhaust gas recirculation (EGR) system that provides a heat exchanger which reduces the temperature of the exhaust gas prior to introducing the exhaust gas to the cylinders of the engine. The heat exchanger can be integral to the engine, particularly the cylinder head of the engine, or it can be disposed outside the structure of the engine. When disposed outside the structure of the engine, the heat exchanger can comprise a tubular structure that causes exhaust gas and water, from the body of water, to flow in thermal communication with each other. Alternatively, the heat exchanger which is disposed outside the structure of the engine can use a cavity within the driveshaft housing as a heat exchanger with water being sprayed into the stream of exhaust gas as it passes from the engine to the cavity.

U.S. Pat. No. 7,001,231 discloses a water cooling system for an outboard motor having a water conduit that extends through both an idle exhaust relief passage and a primary exhaust passage. Water within the water conduit flows through first and second openings to distribute sprays or streams of water into first and second exhaust conduits, which can be the primary and idle exhaust relief passages of an outboard motor.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

In examples disclosed herein, a marine engine has an internal combustion engine; an exhaust conduit that conveys exhaust gas from the internal combustion engine; a cooling water sprayer that sprays a first flow of cooling water into the exhaust conduit; and a cooling jacket that conveys a second flow of cooling water alongside the exhaust conduit so that the second flow of cooling water cools the exhaust conduit. The first flow of cooling water and at least part of the second flow of cooling water are merged and then sprayed together into the exhaust conduit via the cooling water sprayer. In examples disclosed herein, a strainer is disposed in the cooling jacket and configured to strain the second flow of cooling water prior to being sprayed into the exhaust conduit.

In examples disclosed herein, a cooling water sprayer is for a marine engine, in particular for spraying cooling water into an exhaust conduit to thereby cool exhaust gas in the exhaust conduit. The cooling water sprayer comprises a body having a through-bore that is configured to convey a first flow of the cooling water into the exhaust conduit and a cross-bore that is transverse to the through-bore and is configured to convey a separate, second flow of the cooling water into the first flow of cooling water in the through-bore such that the first and second flows of cooling water are merged in the cooling water sprayer.

DETAILED DESCRIPTION OF THE DRAWINGS

Figure 1:
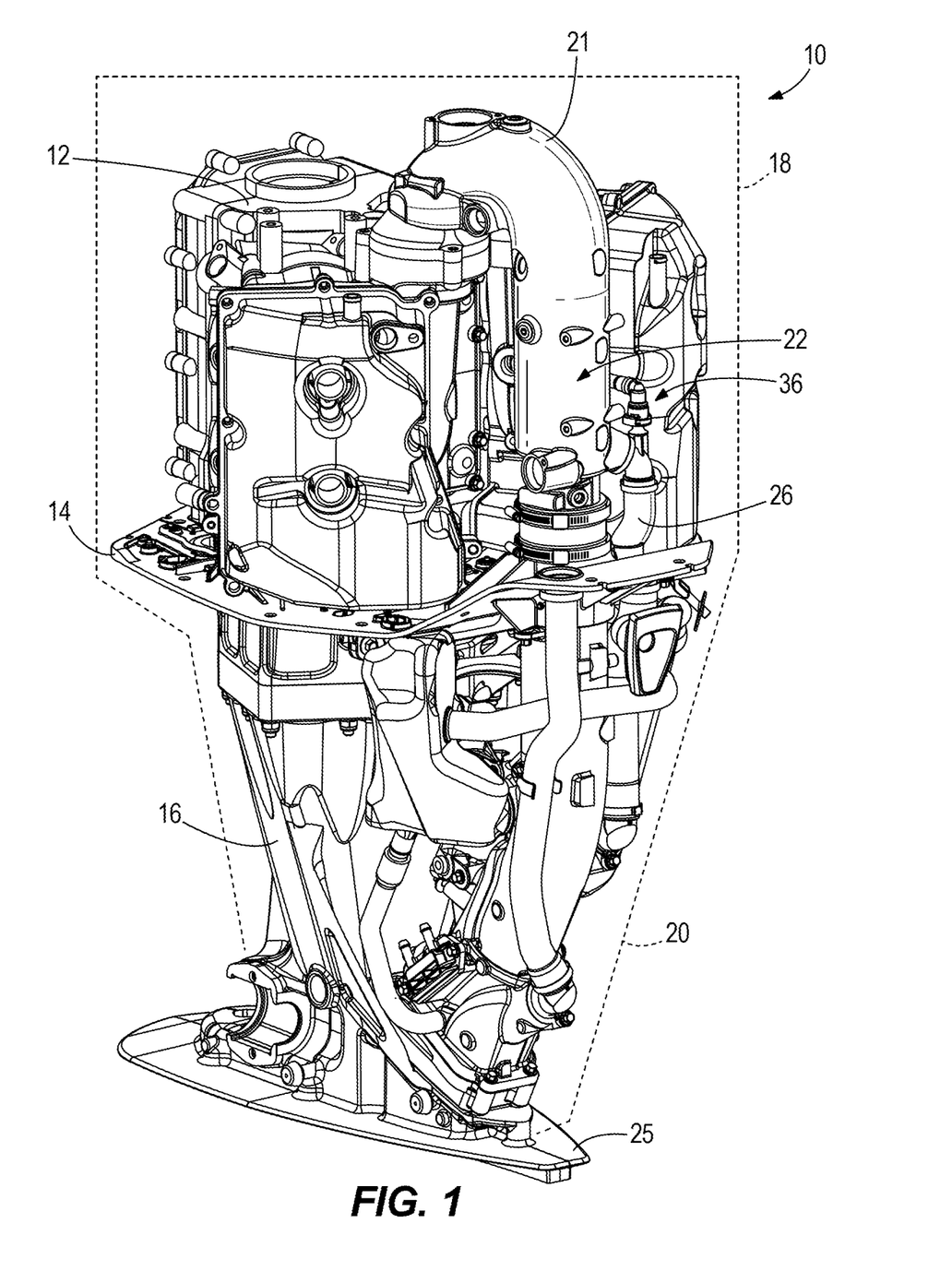
FIG. 1 is a perspective view of an outboard motor having a cooling system according to the present disclosure.

FIG. 1 depicts an exemplary outboard motor 10 for propelling a marine vessel in a body of water. The outboard motor 10 has an internal combustion engine 12 that is supported with respect to the marine vessel via a conventional mounting arrangement associated with an underlying adapter plate 14. A driveshaft housing 16 extends below the adapter plate 14, opposite the internal combustion engine 12. The type and configuration of internal combustion engine 12 can vary from what is shown. In the illustrated example, the internal combustion engine 12 has a V-shape which discharges exhaust gases inside of the V-shape to a centrally located exhaust conduit 22. The internal combustion engine 12 and exhaust conduit 22 are configured in the manner disclosed in the above incorporated U.S. Pat. No. 9,616,987. Briefly, combustion within the internal combustion engine 12 creates exhaust gas, which is centrally conveyed into the valley of the V-shape and then directed upwardly and then downwardly through an exhaust manifold and elbow portion 21 of the exhaust conduit 22. The exhaust conduit 22 conveys the exhaust gas downwardly from the elbow portion 21 to the adapter plate 14. The exhaust gas is ultimately discharged from the outboard motor 10 via a conventional underwater exhaust outlet. FIG. 1 also schematically depicts an upper cowling 18 covering the internal combustion engine 12 and related components and a lower cowling 20 covering the driveshaft housing 16 and related components. The upper cowling 18 is located above the lower cowling 20. The shape and configuration of the upper and lower cowlings 18, 20 can vary.

Figure 2:
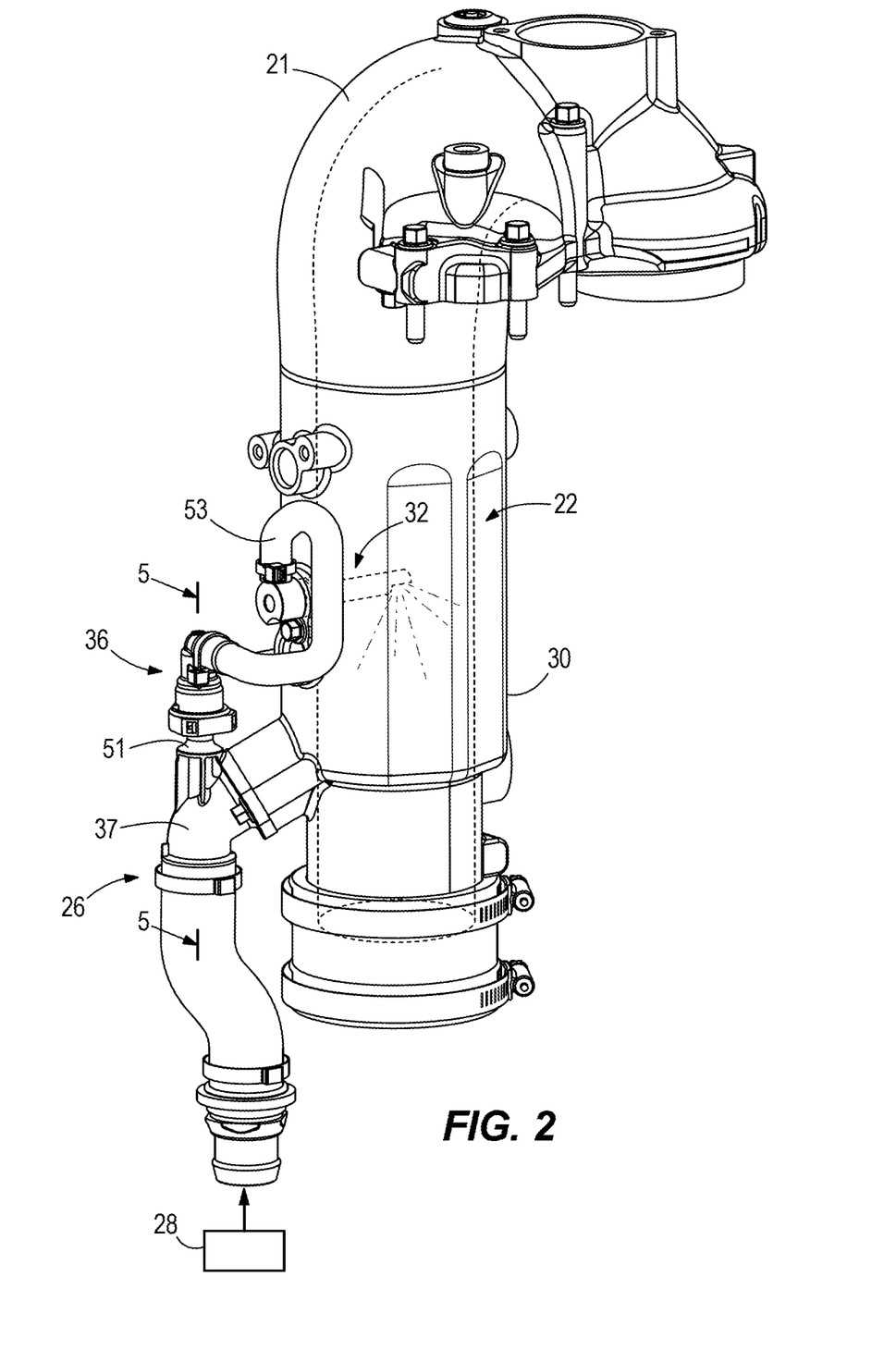
FIG. 2 is a perspective view of an exhaust conduit and a cooling fluid conduit that conveys cooling fluid for cooling the exhaust conduit.

FIGS. 1 and 2 also depict portions of a cooling system for cooling certain components of the internal combustion engine 12, including for example the above-noted exhaust conduit 22. A pump 28 is configured to pump cooling fluid (e.g., relatively cold water from the body of water in which the outboard motor 10 is operating) to the internal combustion engine 12 via a cooling fluid conduit (i.e., a cooling water conduit) 26. The pump 28 is shown schematically in FIG. 2 and can include any type of conventional pump device for pumping cooling fluid, including for example a mechanical pump powered by the driveshaft of the internal combustion 12 or an electrical pump powered by a battery associated with the outboard motor 10. In the illustrated example, the pump 28 is configured to pump cooling water from a conventional underwater inlet on a lower portion of the outboard motor 10. The conventional underwater inlet is not shown in FIG. 2 however one suitable configuration is disclosed in the incorporated U.S. Pat. No. 8,540,536. Typically the underwater inlet is located in the gear case housing of the outboard motor, below the anti-cavitation plate 25 shown in FIG. 1. Reference is made to the '536 patent, showing one example. The pump 28 pumps the cooling water upwardly to the internal combustion engine 12 via the cooling water conduit 26, as shown by arrows in FIGS. 2 and 5. For further background information, the '536 patent also discloses conveyance of the cooling water to an internal combustion engine, as well as an exhaust system for conveying exhaust gas from the internal combustion engine, via cooling water conduits.

Figure 5:
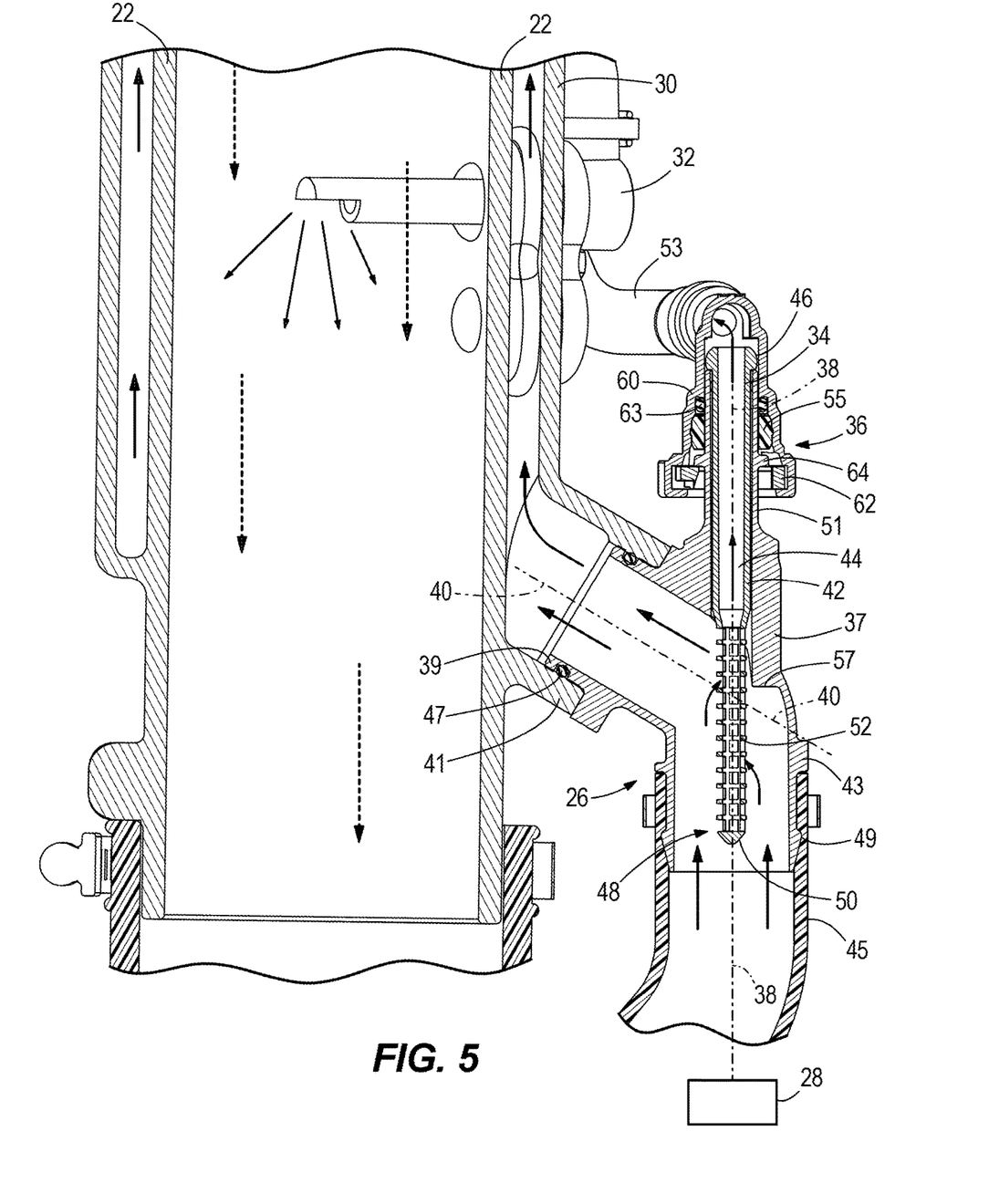
FIG. 5 is a view of section 5-5, taken in FIG. 2.

Referring to FIGS. 2 and 5, the pump 28 pumps the cooling water via the cooling water conduit 26 to a cooling water jacket 30 disposed on the exhaust conduit 22. As the relatively cold cooling water is pumped vertically upwardly through the cooling water jacket 30, it naturally exchanges heat with the relatively hot exhaust conduit 22 and thus also the relatively hot exhaust gas flowing downwardly there through. See e.g. the dashed arrows in FIG. 5. Reference is also made to the above-incorporated U.S. Pat. No. 8,540,536 for further details regarding prior art cooling systems having an exhaust conduit and a cooling water jacket disposed thereon and configured for heat exchange with relatively hot exhaust gas flowing there through. As is conventional, the cooling water flows from upstream to downstream through the cooling water jacket 30, under pressure from the pump 28, and is then routed to the internal combustion engine 12 for further heat exchange with components thereof, including for example the cylinder heads, cylinder block, etc. Once the cooling water has completed its path through the cooling system, it typically is discharged back to the body of water in which the outboard motor 10 is operating via for example an underwater outlet on the outboard motor 10.

It is known in the art to provide one or more strainers in the above-described cooling system to strain solid/particulate material of a certain size from the cooling water. In use, prior art strainers can unfortunately become clogged, especially when the outboard motor is operated in a body of water having high debris content. When the strainer becomes clogged, the cooling functionality of the system is compromised and the internal combustion engine is put at risk of overheating. Thus, it is typically recommended that the operator of the outboard motor routinely service the strainer(s). The strainer(s) should be routinely checked for clogs and any other problems. However the present inventors have found that this process can be especially challenging and cumbersome because prior art strainers are usually located below the adapter plate, under the lower cowling. Access to a plugged strainer usually requires the operator or service technician to remove the lower cowling and then remove other connection features associated with the strainer (e.g. fasteners, brackets, etc.).

The present disclosure is a result of the present inventors' efforts to provide cooling systems and strainers for cooling systems that are both more effective and easier to service.

Figure 3:
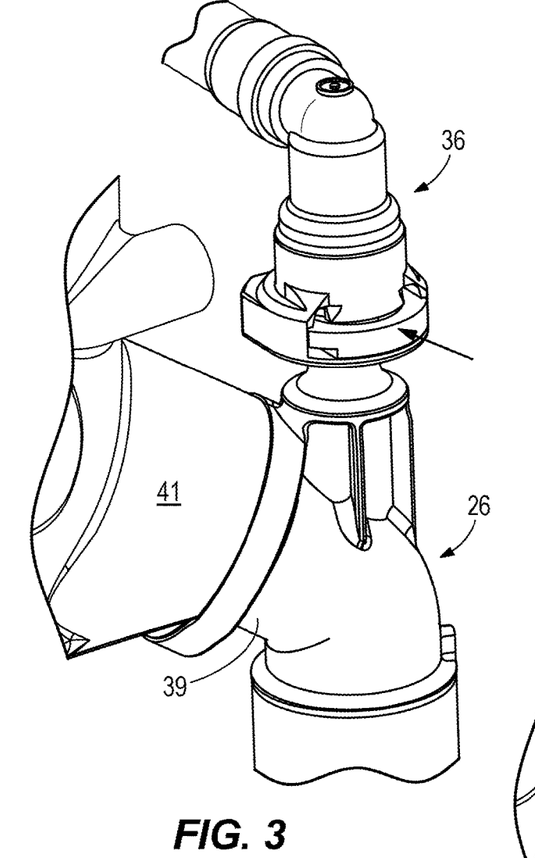
FIGS. 3 and 4 are views of a strainer disposed in the cooling fluid conduit and configured to strain the cooling fluid and a quick connector that is manually operable to connect and disconnect the strainer from the cooling fluid conduit.
Figure 4:
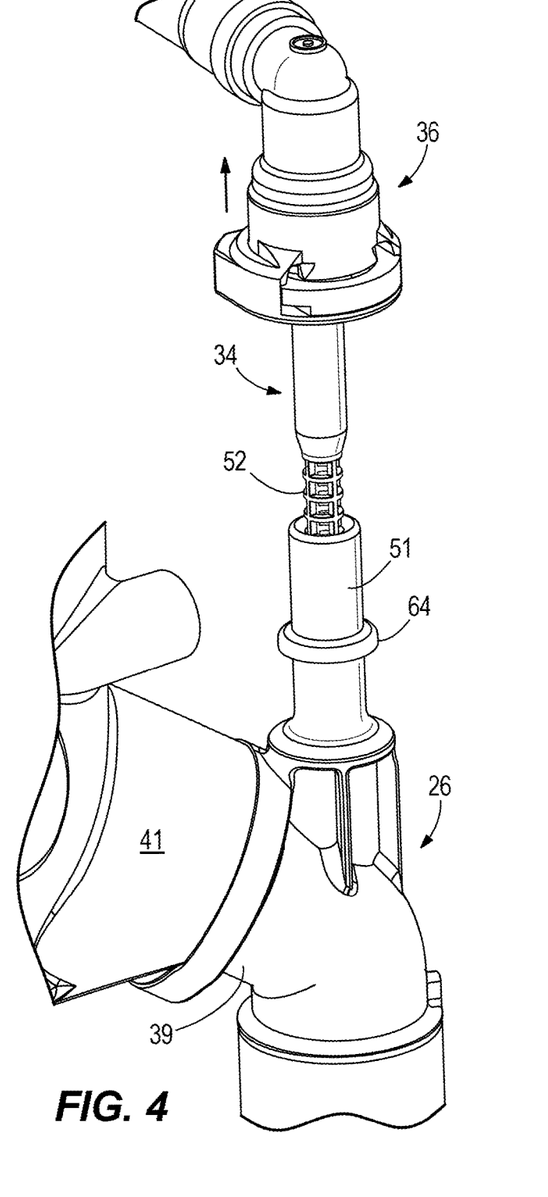
Figure 6:
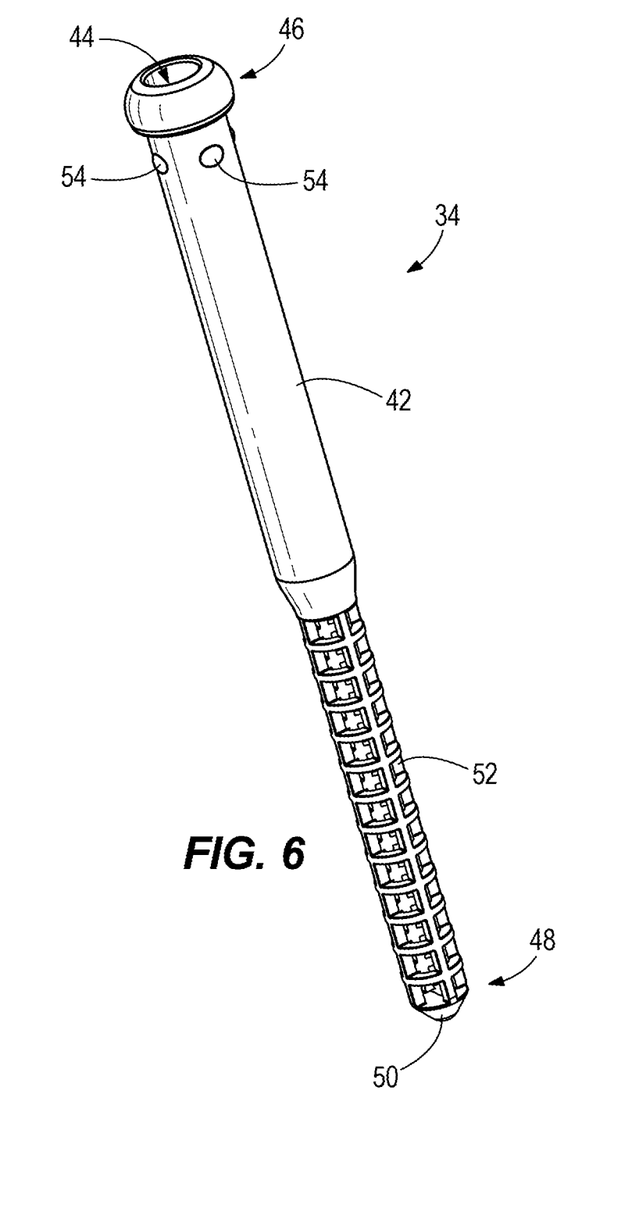
FIG. 6 is an isometric view of the strainer.

Referring to FIGS. 4-6, according to the present disclosure, a strainer 34 is disposed in the cooling water conduit 26 at a location above the adapter plate 14. Referring to FIGS. 2-6, the strainer 34 is easily accessible by the operator, requiring only removal of the upper cowling 18 and removal of a quick connector 36 that connects the strainer 34 to the cooling water conduit 26. The quick connector 36 is manually operable to allow the operator to easily connect and disconnect the strainer from the cooling water conduit 26 without the need for tools. As explained further herein below, the strainer 34 is also uniquely configured to more efficiently strain the cooling water flowing into the exhaust conduit 22 and the cooling water flowing into the cooling water jacket 30, as compared to the prior art, and is also less likely to clog. Other advantages and improvements over the prior art will be apparent from the following description of the drawings.

As shown in FIG. 5, the cooling water conduit 26 includes an elbow fitting 37 that has a first outlet port 39 attached to an inlet boss 41 on the cooling water jacket 30. An O-ring seal 47 is disposed between the elbow fitting 37 and the inlet boss 41 so as to form a fluid tight seal there between. The elbow fitting 37 further includes an inlet port 43 that receives cooling water from the pump 28 via a flexible hose 45. The flexible hose 45 is clamped to a barb 49 on the inlet port 43 so as to form a fluid tight seal there between. The elbow fitting 37 also has a second outlet port 51 to which the strainer 34 is connected by the quick connector 36.

The cooling water conduit 26 and the quick connector 36 define a first axially extending flow path 38 for the cooling water. The cooling water conduit 26 further defines a second, transversely extending flow path 40 that transversely branches off from the first axially extending flow path 38. The first axially extending flow path 38 extends through the elbow fitting 37 and quick connector 36 to a flexible connection hose 53, which leads to an exhaust sprayer 32 configured to spray cooling water into the exhaust conduit 22 for mixing with and cooling the exhaust gas flowing downwardly there through. The second transversely extending flow path 40 leads to the cooling water jacket 30 on the exhaust conduit 22.

Thus, as shown by arrows in FIG. 5, a first portion of the cooling water flows upwardly along the first axially extending flow path 38, through the strainer 34, and on to the exhaust sprayer 32 via the connection hose 53. A second portion of the cooling water flows through the strainer 34 and then transversely along the second transversely extending flow path 40. The second portion of the cooling water generally includes cooling water flowing on the radially outer side of the inlet port 43, diametrically opposite the cooling water jacket 30. A shoulder 57 is formed on the radially outer side of the inlet port 43 so as to transversely redirect the second portion of the cooling water along the second transversely extending flow path 40, through the strainer 34, and then into the first outlet port 39. A third portion of the cooling water that generally consists of cooling water flowing along the radially inner side of the inlet port 43, bypasses the strainer 34, and then flows through the second, transversely extending flow path 40.

As shown in FIG. 5, the strainer 34 axially extends into the cooling water conduit 26 along the first axially extending flow path 38. Referring to FIGS. 5 and 6, the strainer 34 includes a body 42 that has a through-bore 44, a first axial end 46 that is mated with the quick connector 36, and a second axial end 48 that freely extends into the cooling water conduit 26. As shown in FIG. 5, the cooling water conduit 26 conveys the cooling water from upstream to downstream and the second axial end 48 is located upstream of the first axial end 46, such that the second axial end 48 faces the cooling water as it is conveyed. Referring to FIG. 6, an end cap 50 is disposed on the second axial end 48 of the strainer 34. A filter or screen 52 extends along the body 42 and is configured to strain the cooling water as it flows from the cooling water conduit 26 into the through-bore 44 in the body 42. The screen 52 is located closer to the second axial end 48 than the first axial end 46. A plurality of bumps 54 extend radially outwardly from the body 42 and are spaced apart around the body 42 at the first axial end 46. An annular rib 56 is formed at the first axial end 46. The bumps 54 and annular rib 56 are configured for engagement with the second outlet port 51 and quick connector 36, respectively, as further described herein below.

The configuration of the quick connector 36 can vary from what is shown in the drawings. Referring to FIG. 5, the illustrated example is a SAEJ2044 Quick Connect Fitting, which for example is commercially available from Parker Hannifin. The quick connector 36 is manually operable to easily connect and disconnect the strainer 34 from the cooling water conduit 26 and from the quick connector 36. The quick connector 36 includes an elongated body 60 having a through-bore sized to fit onto the outer diameter of the second outlet port 51 of the elbow fitting 37. The quick connector 36 has a retention ring 62 with an inner diameter that is sized slightly smaller than the outer diameter of an annular ring 64 on the second outlet port 51. As shown by an arrow in FIG. 3, the retention ring 62 is manually deformable by pressing on the outer surface thereof. Manually deforming the retention ring 62 changes the dimensions of its inner diameter so as to free the quick connector 36 for axial removal from the second outlet port 51. That is, the retention ring 62 is able to pass over the annular ring 64 when the retention ring 62 is manually pressed. See FIG. 4.

The quick connector 36 can be manually re-connected to the second outlet port 51 by re-inserting the strainer 34 into the second outlet port 51 and axially moving the quick connector 36 downwardly onto the second outlet port 51, until the retention ring 62 is forced to deform over the outer diameter of the annular ring 64. The natural resiliency of the retention ring 62, which can be made of plastic, causes it to snap back into its natural shape once it axially passes by the retention ring 62, thus engaging with the second outlet port 51 in a snap-fit manner. An inner O-ring seal 63 is configured to seal with the outer diameter of the second outlet port 51. The bumps 54 on the outer diameter of the body 42 of the strainer 34 are configured to engage in a press-fit connection with the inner diameter of the second outlet port 51.

Referring to FIGS. 3-6, the quick connector 36 facilitates quick and easy checking and maintenance of the strainer 34, including removal any clogs or other debris. FIG. 3 depicts the quick connector 36 in a connection position on the second outlet port 51. When the retention ring 62 is manually engaged and deformed, the body 60 is removable from the second outlet port 51, as described above and shown in FIG. 4. When the body 60 of the quick connector 36 is manually withdrawn from the second outlet port 51, the strainer 34 will tend to remain seated in the second outlet port 51 due to the frictional engagement between the bumps 54 and the inner diameter of the second outlet port 51. As the body 60 of the strainer 34 is removed, the annular rib 56 on the first axial end 46 of the strainer 34 is engaged by an inner mantle piece 55 on the quick connector 36, which pulls the strainer 34 out of the second outlet port 51 along with the quick connector 36, overcoming the frictional engagement between the bumps 54 and the inner diameter of the second outlet port 51. The inner mantle piece 55 is sized just slightly larger than the annular rib 56 so that the engagement there between is strong enough to pull the strainer 34 out of engagement with the second outlet port 51. However the engagement between the inner mantle piece 55 and annular rib 56 can be configured so that it can be overcome by a stronger manual force, i.e. manually pulling the strainer 34 out of the body 60 of the quick connector 36. That is, the inner mantle piece 55 and/or the annular rib 56 are made of a resilient material such as plastic, which will slightly deform under a sufficient manual separating force. This allows separation of the strainer 34 from the quick connector 36 after the quick connector 36 has been removed from the second outlet port 51, thus facilitating cleaning and/or repair of both components.

The location of the strainer 34 on the outboard motor 10 and the configuration of the quick connector 36 advantageously provide the operator with an accessible arrangement that does not require tools or fasteners for assembly and disassembly. The inline configuration of the strainer facilitates improved flow area and straining functionality over the prior art, thus improving performance. The shape of the strainer and orientation of the strainer in the cooling water conduit is less restrictive for water flow, as compared to the prior art, and also facilitates self-cleaning during shutdown of the internal combustion engine. Large debris is less likely to get stuck on the strainer because of its axial (inline) orientation with the flow of water. Large debris will tend to deflect off of the closed end cap 50, without getting stuck. This configuration can also be easily inspected without removal of the lower cowling. In certain examples, the second outlet port 51 of the elbow fitting 37 can be made of transparent material (e.g. plastic), thus allowing for easier visual inspection without requiring removal of the quick connector 36 from the second outlet port 51.

Through research and development, the present inventors have also endeavored to improve upon prior art cooling systems having strainers and water sprayers for spraying cooling water into outflowing exhaust gas from an internal combustion engine. The present inventors have determined that it would be advantageous to provide a cooling system with a dual sprayer that operates based on more than one water source. The inventors identified that this type of arrangement would advantageously reduce the chance of the exhaust sprayer becoming totally plugged, thus limiting the risk of overheating of the internal combustion engine. The inventors further identified that it would be advantageous to provide such a dual sprayer in a package that is easily serviced by the operator or technician. The present disclosure arose out of these recognitions by the inventors.

Figure 7:
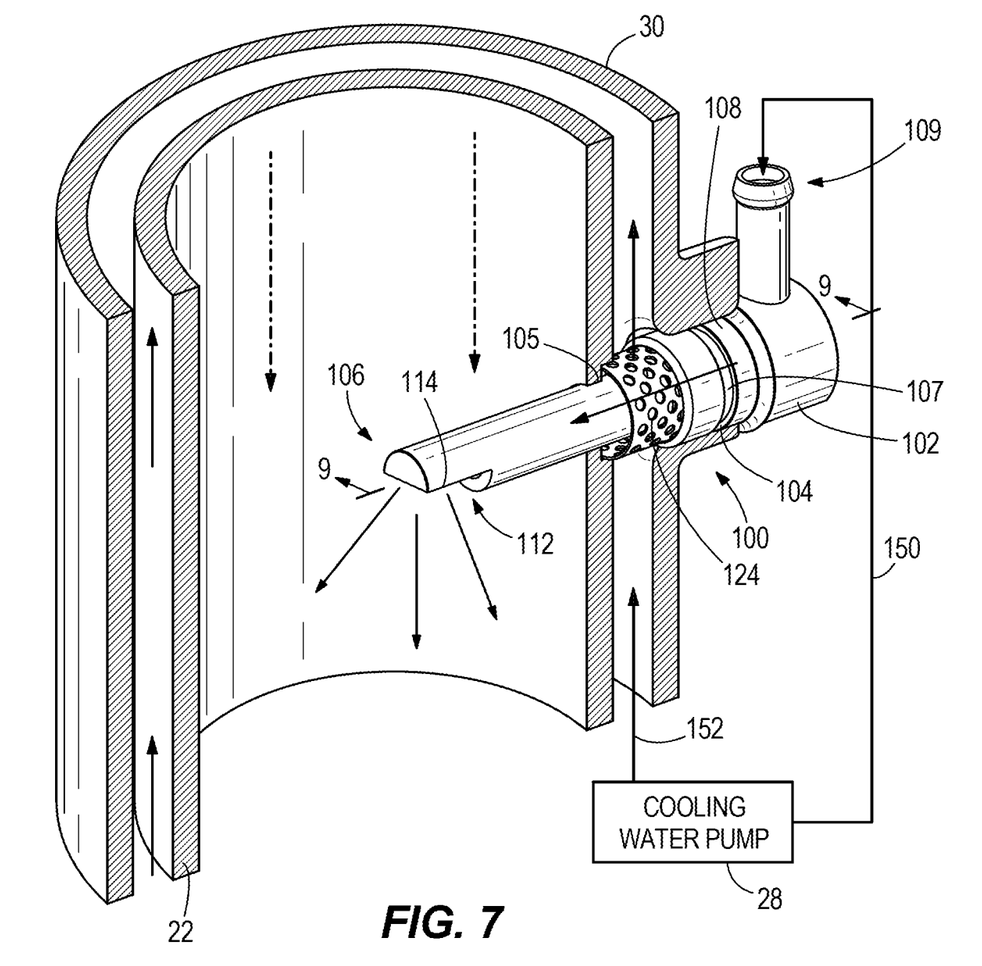
FIG. 7 is a section view of an exhaust conduit that conveys exhaust gas from an internal combustion engine, a first embodiment of a cooling water sprayer that sprays cooling water into the exhaust conduit, and a cooling water jacket that conveys cooling water alongside the exhaust conduit.
Figure 8:
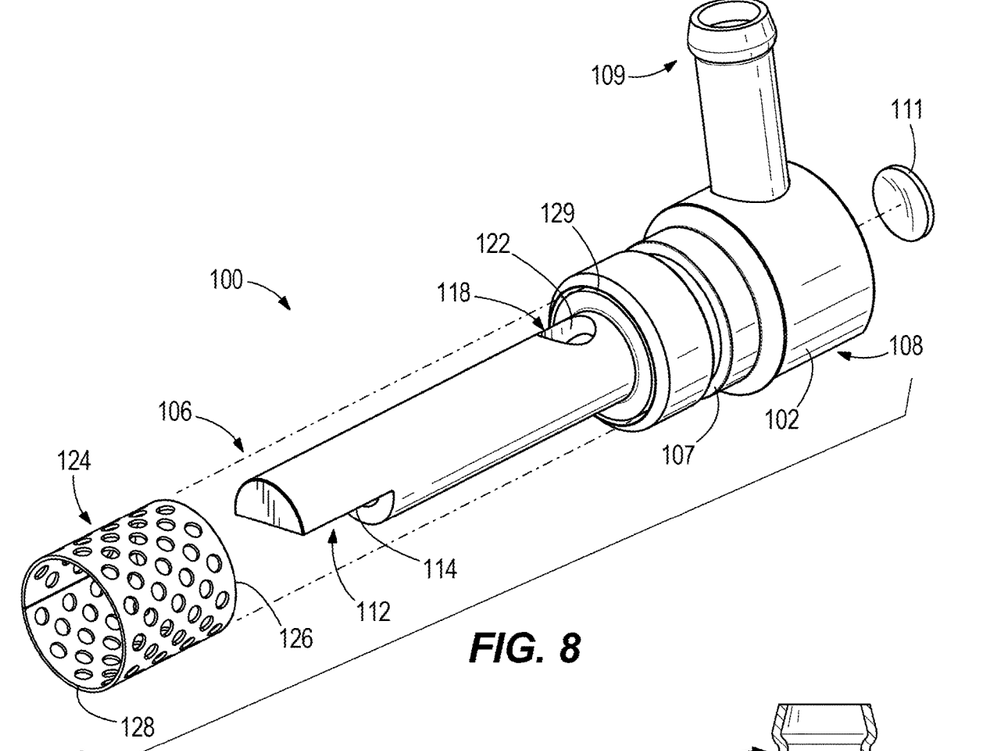
FIG. 8 is an exploded view of the first embodiment of the cooling water sprayer.
Figure 9:
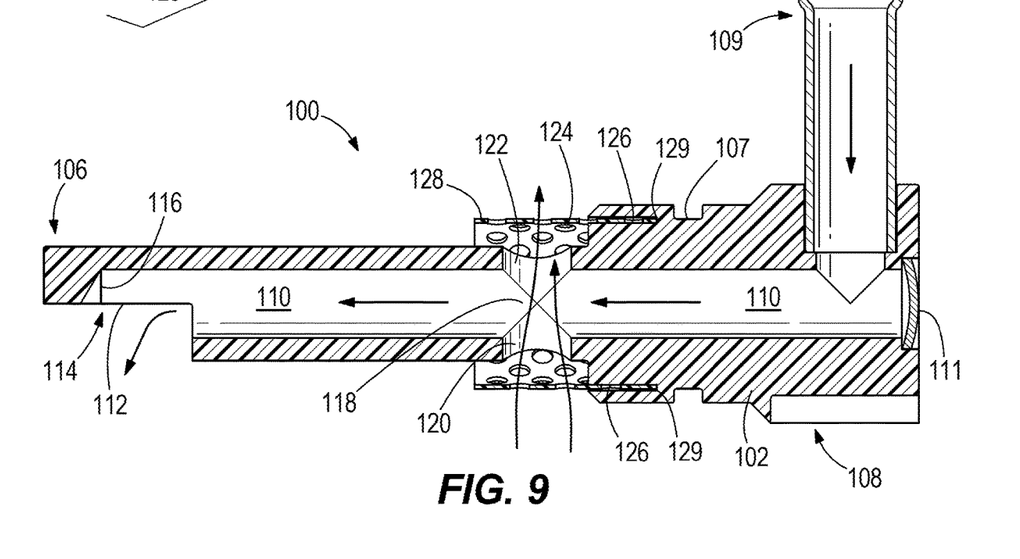
FIG. 9 is a view of section 9-9, taken in FIG. 7.

Referring to FIGS. 7-9, a first embodiment of an improved cooling water sprayer 100 is shown. The cooling water sprayer 100 includes a body 102 that extends through a cross-bore 104 in the cooling water jacket 30 and a cross-bore 105 in the exhaust conduit 22. The cooling water sprayer 100 includes a free end 106 extending into and disposed in the exhaust conduit 22 and a fixed end 108 that is seated in the cross-bore 104. The fixed end 108 has an outer O-ring groove 107 in which a rubber O-ring is seated for fluid-tight sealing with an inner diameter of the cross-bore 104 in the cooling water jacket 30.

The body 102 defines a through-bore 110 extending from the fixed end 108 to the free end 106 and configured to convey cooling water there through. The free end 106 defines a nozzle 112 that is configured to spray cooling water into the downwardly flowing exhaust gas, shown by dash-and-dot arrows in FIG. 7. The configuration of the nozzle 112 can vary from what is shown in the drawings. In the illustrated example, the nozzle 112 includes a cutaway 114 at the free end 106. An end wall 116 at the free end 106 redirects the flow of cooling water from the through-bore 110 and causes the cooling water to spray into the exhaust gas traveling downwardly in the exhaust conduit 22. The fixed end 108 of the body 102 has an inlet boss 109 for connection to, for example, a hose that supplies a flow of cooling water. An end cap 111 is disposed on the through-bore 110 at the fixed end 108 closing the through-bore 110 and preventing leakage of cooling water out of the fixed end 108.

The body 102 further includes a cross-bore 118 that is transversely oriented to the through-bore 110 and passes completely through the cooling water sprayer 100. The cross-bore 118 includes an inlet 120 oriented downwardly and facing the oncoming (upward) flow of cooling water in the cooling water jacket 30. The cross-bore 118 further includes an outlet 122 that is located diametrically opposite to the inlet 120 with respect to the through-bore 110. The outlet 122 allows cooling water to flow out of the through-bore 110 and into the cooling water flowing upwardly in the cooling water jacket 30.

A strainer 124 is disposed extends over the cross-bore 110 and is configured to strain cooling water that flows from the cooling water jacket 30 into the through-bore 110. The configuration of the strainer 124 can vary from that is shown. In the illustrated example the strainer 124 is cylindrical and extends coaxially around the body 102. The strainer 124 has a first end 126 that is retained in a peripheral channel 129 on the body 102 on one side of the cross-bore and a second free end 128 on the opposite side of the cross-bore 118. In the illustrated example, the strainer 124 extends over both the inlet 120 and the outlet 122 so as to strain the cooling water flowing into the cross-bore 118 and the cooling water flowing out of the cross-bore 118. The strainer 124 can have a minimum hole diameter of 1.5 mm so that it effectively screens the cooling water of debris that could plug the cooling water sprayer 100. Again however, the configuration of the strainer 124 can vary from what is shown and described, and for example could be configured to strain cooling water at only one of the inlet 120 and outlet 122.

The cooling water sprayer 100 can for example be made of stainless steel; however other materials can be used. Advantageously, the cooling water sprayer 100 is located above the adapter plate 14, so that it is accessible by removal of the upper cowling 18 while the lower cowling 20 remains in place. The cooling water sprayer 100 can be removed on the water for service with minimal tools.

Figure 10:
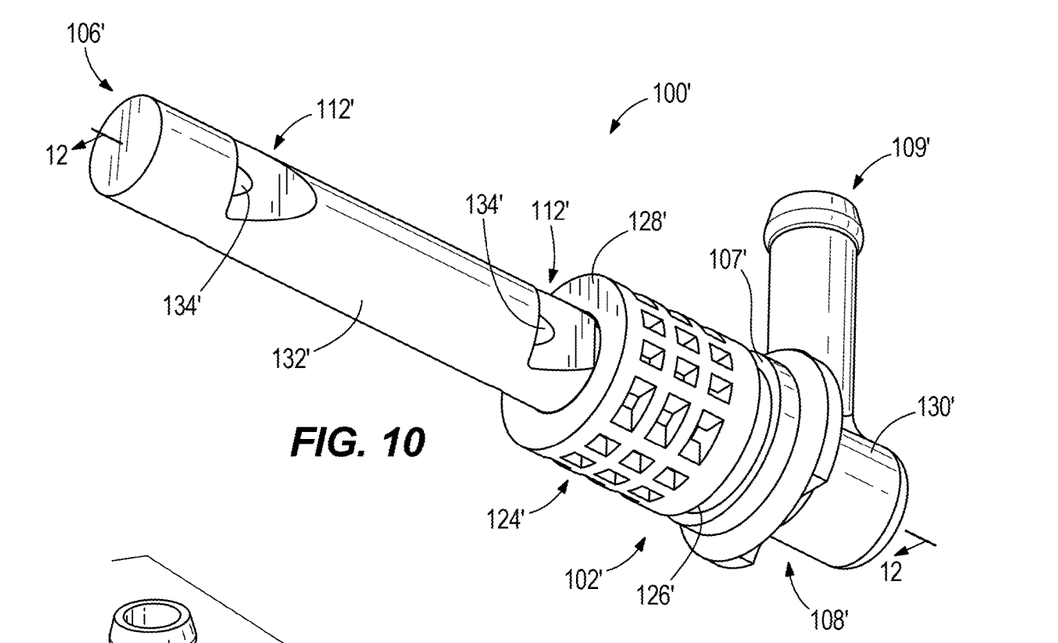
FIG. 10 is a perspective view of a second embodiment of the cooling water sprayer.
Figure 11:
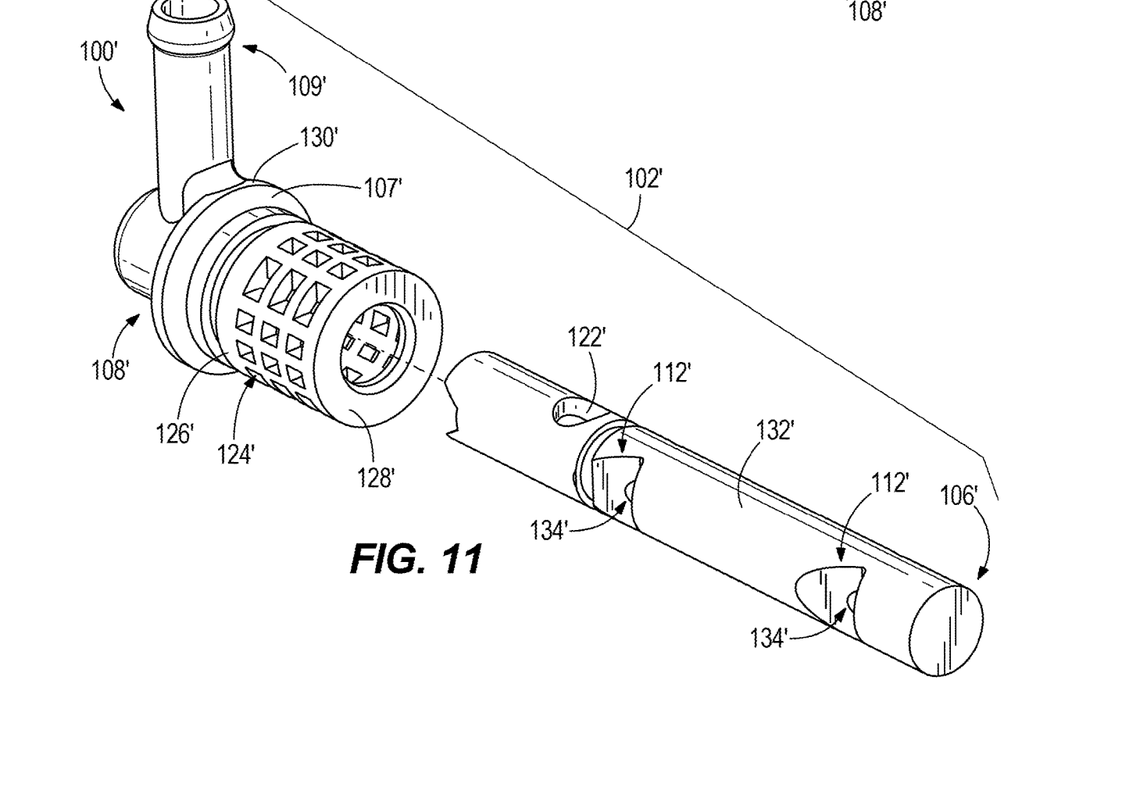
FIG. 11 is an exploded view of the second embodiment of the cooling water sprayer.
Figure 12:
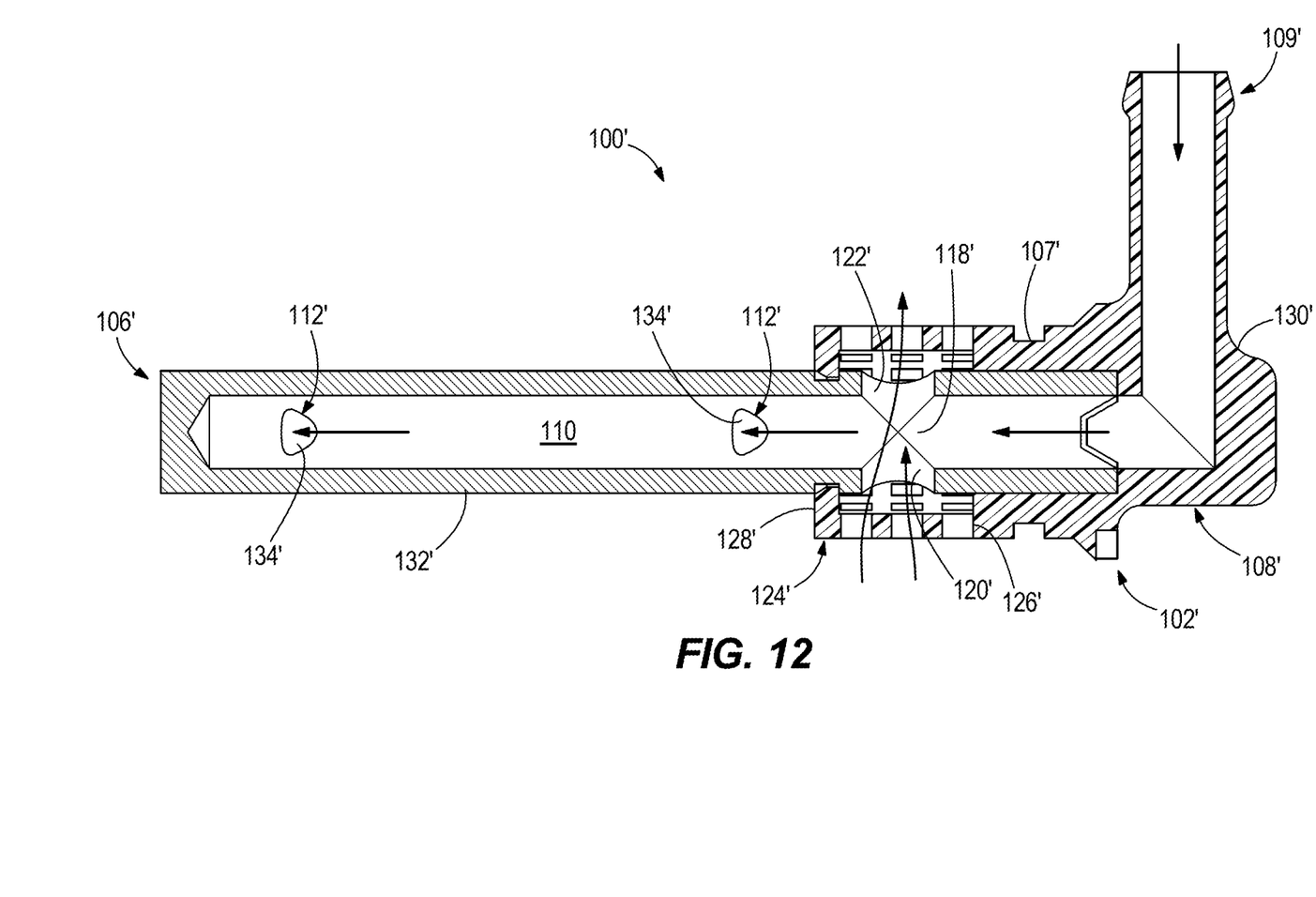
FIG. 12 is a view of section 12-12, taken in FIG. 10.

FIGS. 10-12 depict another example of a cooling water sprayer 100'. The cooling water sprayer 100' mostly functions the same as the cooling water sprayer 100, except for a few differences. The cooling water sprayer 100' has a two-part body 102', including a base 130' and an extension 132' that is seated in the base 130'. The extension 132' has a pair of apertures 134' formed along the extension 132' which are shaped as nozzles 112'. The apertures 134' are configured to spray the cooling water into the exhaust gas flowing through the exhaust conduit 22. The strainer 124' is formed with the body 102'. The extension 132' should be resilient to heat from the exhaust gas flowing through the exhaust conduit 22. Connection of the base 130' to the metal exhaust conduit 22 and cooling water jacket 30 should preferably be resistant to galvanic corrosion, which can occur at a traditional interface between an aluminum bore and a stainless fitting.

Thus, the base 130' of the cooling water sprayer 100' can for example be made of corrosive resistant injection molded nylon; however other materials can be used. The extension 132' can be made of stainless steel; however other materials can be used. Advantageously, the cooling water sprayer 100' is located above the adapter plate 14, so that it is accessible by removal of the upper cowling 18 while the lower cowling 20 remains in place. The cooling water sprayer 100' can be removed on the water for service with minimal tools.

The present disclosure thus provides a cooling water sprayer 100, 100' that sprays a first flow of cooling water 150 (see FIG. 7) into the exhaust conduit 22. A cooling water jacket 30 conveys a second flow of cooling water 152 (see FIG. 7) alongside the exhaust conduit 22 so that the second flow of cooling water 152 cools the exhaust conduit 22. The first flow of cooling water 150 and at least a portion of the second flow of cooling water 152 are merged and then sprayed together into the exhaust conduit 22 via the cooling water sprayer 100, 100'. As shown in FIG. 7, the first and second flows of cooling water 150, 152 flow in parallel with respect to each other before being merged at the cooling water sprayer 100, 100'.

The cooling water sprayer 100, 100' has a through-bore 110, 110' that conveys the first flow of cooling water 150 into the exhaust conduit 22 and a cross-bore 104, 105; 104', 105' that is transverse to the through-bore 110, 110' and conveys the portion of the second flow of cooling water 152 into the first flow of cooling water 150 in the through-bore 110, 110'. The cross-bore 104, 105; 104', 105' extends through the cooling water sprayer 100, 100' so that a remaining portion of the second flow of cooling water 152 passes through the cooling water sprayer 100, 100' and continues to flow in the cooling water jacket 30.

A strainer 34 strains the first flow of cooling water 150 and the second flow of cooling water 152, and a strainer 124, 124' strains only the second flow of cooling water 152. In this combination, the strainer 34 can be any type of strainer located remotely located with respect to the cooling water sprayer 100, 100'. The strainer 124, 124' is located on the cooling water sprayer 100, 100'. The cooling water pump 28 pumps the first flow of cooling water 150 through the cooling water sprayer 100, 100' and the second flow of cooling water 152 through the cooling water jacket 30. The cooling water sprayer 100, 100' is located above the adapter plate 14 so that it is accessible upon removal of the upper cowling 20 while the lower cowling 18 remains in place.

The cooling water sprayer 100, 100' includes an elongated body 102 that extends through and is seated in the cross-bores 104, 105; 104', 105' in the cooling water jacket 30 and the exhaust conduit 22, respectively. The cooling water sprayer 100, 100' has a free end 106 having a nozzle 112, 112' that extends into the exhaust conduit 22 and is configured to spray cooling water into the exhaust gas.

Advantageously, the cooling water sprayer 100, 100' is less susceptible to total plugging, as compared to the prior art, based at least upon the fact that it operates with dual cooling water sources. In addition, the unique way in which the cooling water sprayer 100, 100' merges the first and second flows of cooling water 150, 152 in the through-bore 110 disturbs particulate matter that collects on the strainer 124, 124', thus limiting the chance of a total clog. The location of the strainer 124, 124' in the cooling water jacket 30 provides a compact arrangement having a low profile, thus meeting packaging constraints, wherein space is a premium on marine engine designs. The cooling water sprayer 100, 100' and strainer 124, 124' are easily serviced by an operator or technician by simply removing the upper cowling 18 and then removing the cooling water sprayer 100, 100' from the cross-bores 104, 105; 104', 105'.

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A marine engine comprising an internal combustion engine; an exhaust conduit that conveys exhaust gas from the internal combustion engine; a cooling water sprayer that sprays a first flow of cooling water into the exhaust conduit; and a cooling water jacket that conveys a second flow of cooling water alongside the exhaust conduit so that the second flow of cooling water cools the exhaust conduit, wherein the first flow of cooling water and at least a portion of the second flow of cooling water are separate before being merged and then sprayed together into the exhaust conduit via the cooling water sprayer.

2. A marine engine comprising an internal combustion engine; an exhaust conduit that conveys exhaust gas from the internal combustion engine; a cooling water sprayer that sprays a first flow of cooling water into the exhaust conduit; and a cooling water jacket that conveys a second flow of cooling water alongside the exhaust conduit so that the second flow of cooling water cools the exhaust conduit, wherein the first flow of cooling water and at least a portion of the second flow of cooling water are merged and then sprayed together into the exhaust conduit via the cooling water sprayer;
wherein the first and second flows of cooling water flow parallel with respect to each other before being merged.

3. The marine engine according to claim 2, wherein the first flow of cooling water and the portion of the second flow of cooling water are merged in the cooling water sprayer.

4. The marine engine according to claim 3, wherein the cooling water sprayer comprises a through-bore that conveys the first flow of cooling water into the exhaust conduit and a cross-bore that is transverse to the through-bore and conveys the portion of the second flow of cooling water into the first flow of cooling water in the through-bore.

5. The marine engine according to claim 4, wherein the cross-bore extends through the cooling water sprayer so that a remaining portion of the second flow of cooling water passes through the cooling water sprayer and continues to flow in the cooling water jacket.

6. The marine engine according to claim 4, further comprising a first strainer that strains the first flow of cooling water and the second flow of cooling water, and a second strainer that strains only the second flow of cooling water.

7. The marine engine according to claim 6, wherein the first strainer is remotely located with respect to the cooling water sprayer and wherein the second strainer is located on the cooling water sprayer.

8. A marine engine comprising an internal combustion engine; an exhaust conduit that conveys exhaust gas from the internal combustion engine; a cooling water sprayer that sprays a first flow of cooling water into the exhaust conduit; and a cooling water jacket that conveys a second flow of cooling water alongside the exhaust conduit so that the second flow of cooling water cools the exhaust conduit, wherein the first flow of cooling water and at least a portion of the second flow of cooling water are merged and then sprayed together into the exhaust conduit via the cooling water sprayer;
further comprising a first strainer that strains the first flow of cooling water and the second flow of cooling water, and a second strainer that strains only the second flow of cooling water.

9. The marine engine according to claim 8, wherein the first strainer is remotely located with respect to the cooling water sprayer and wherein the second strainer is located on the cooling water sprayer.

10. The marine engine according to claim 1, further comprising at least one cooling water pump configured to pump the first flow of cooling water through the cooling water sprayer and the second flow of cooling water through the cooling water jacket.

11. A marine engine comprising an internal combustion engine; an exhaust conduit that conveys exhaust gas from the internal combustion engine; a cooling water sprayer that sprays a first flow of cooling water into the exhaust conduit; and a cooling water jacket that conveys a second flow of cooling water alongside the exhaust conduit so that the second flow of cooling water cools the exhaust conduit, wherein the first flow of cooling water and at least a portion of the second flow of cooling water are merged and then sprayed together into the exhaust conduit via the cooling water sprayer;

wherein the internal combustion is supported on an adapter plate and enclosed in an upper cowling; further comprising a lower cowling located below the upper cowling and extending below the adapter plate, and wherein the cooling water sprayer is located above the adapter plate so that it is accessible upon removal of the upper cowling while the lower cowling remains in place.

12. A marine engine comprising an internal combustion engine; an exhaust conduit that conveys exhaust gas from the internal combustion engine; a cooling water sprayer that sprays a first flow of cooling water into the exhaust conduit; and a cooling water jacket that conveys a second flow of cooling water alongside the exhaust conduit so that the second flow of cooling water cools the exhaust conduit, wherein the first flow of cooling water and at least a portion of the second flow of cooling water are merged and then sprayed together into the exhaust conduit via the cooling water sprayer;

wherein the cooling water sprayer comprises an elongated body that extends through and is seated in a cross-bore in the cooling water jacket and the exhaust conduit.

13. The marine engine according to claim 12, wherein the cooling water sprayer comprises a free end having a nozzle that extends into the exhaust conduit and is configured to spray cooling water into the exhaust gas.

14. A marine engine comprising an internal combustion engine; an exhaust conduit that conveys exhaust gas from the internal combustion engine; a cooling water jacket that conveys cooling water alongside the exhaust conduit so as to cool the exhaust conduit; a cooling water sprayer that sprays a portion of the cooling water into the exhaust conduit; and a strainer disposed in the cooling water jacket and configured to strain the portion of the cooling water before it enters the cooling water sprayer, and is sprayed into the exhaust conduit.

15. A marine engine comprising an internal combustion engine; an exhaust conduit that conveys exhaust gas from the internal combustion engine; a cooling water jacket that conveys cooling water alongside the exhaust conduit so as to cool the exhaust conduit; a cooling water sprayer that sprays a portion of the cooling water into the exhaust conduit; and a strainer disposed in the cooling water jacket and configured to strain the portion of the cooling water before it is sprayed into the exhaust conduit;

wherein the sprayer is configured to merge the portion of the cooling water with another flow of cooling water from outside the cooling water jacket.

16. A cooling water sprayer for a marine engine, in particular for spraying cooling water into an exhaust conduit to thereby cool exhaust gas in the exhaust conduit, wherein the cooling water sprayer comprises a body having a through-bore that is configured to convey a first flow of the cooling water into the exhaust conduit and a cross-bore that is transverse to the through-bore and configured to convey a separate, second flow of the cooling water into the first flow of cooling water in the through-bore such that the first and second flows of cooling water are merged in the cooling water sprayer.

17. The cooling water sprayer according to claim 16, further comprising a strainer that strains the second flow of cooling water.

18. The cooling water sprayer according to claim 16, further comprising a nozzle that extends into the exhaust conduit and is configured to spray the cooling water into the exhaust gas.

19. The cooling water sprayer according to claim 18, wherein the body and nozzle are made of metal.

20. The cooling water sprayer according to claim 18, wherein the body is made of a polymer and the nozzle is made of metal.

\* \* \* \* \*